United States Patent
Vummiti et al.

(10) Patent No.: US 11,775,358 B2
(45) Date of Patent: *Oct. 3, 2023

(54) TENANT COPY OPERATION IN A MICROSERVICE ARCHITECTURE

(71) Applicant: SAP SE, Walldorf (DE)

(72) Inventors: Balaji Vummiti, Chennai (IN); Chandan V.A, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,878

(22) Filed: Dec. 1, 2022

(65) Prior Publication Data

US 2023/0100096 A1 Mar. 30, 2023

Related U.S. Application Data

(63) Continuation of application No. 17/484,094, filed on Sep. 24, 2021, now Pat. No. 11,531,575.

(51) Int. Cl.
*G06F 9/54* (2006.01)
*G06F 16/28* (2019.01)

(52) U.S. Cl.
CPC .............. *G06F 9/543* (2013.01); *G06F 9/542* (2013.01); *G06F 16/284* (2019.01)

(58) Field of Classification Search
CPC ............ G06F 9/46; G06F 9/48; G06F 9/4806; G06F 9/542

USPC .......................................... 718/100; 719/318
See application file for complete search history.

(56) References Cited

U.S. PATENT DOCUMENTS

| | | |
|---|---|---|
| 10,402,227 B1 | 9/2019 | Kinney, Jr. |
| 10,592,293 B2 | 3/2020 | Jeuk et al. |
| 2021/0365586 A1 | 11/2021 | Lu et al. |
| 2021/0406102 A1 | 12/2021 | Seetharaman et al. |

OTHER PUBLICATIONS

892 Form dated Aug. 16, 2022 which was issued in connection with U.S. Appl. No. 17/484,094.
Notice of Allowance dated Aug. 16, 2022 which was received in connection with U.S. Appl. No. 17/484,094.

*Primary Examiner* — Andy Ho
(74) *Attorney, Agent, or Firm* — Buckley, Maschoff & Talwalkar LLC (57) ABSTRACT

Computer-readable media, methods, and systems are disclosed for copying tenant data within a cloud-based microservice architecture including a Kubernetes cluster. Copy tasks are generated for a plurality of microservices and progress of the copy tasks is monitored by updating one or more statuses associated with the copy tasks. One or more job files may be generated for each microservice including executable code for copying the tenant data within the microservice or within a data store associated with the respective microservice.

20 Claims, 5 Drawing Sheets

TENANT COPY OPERATION IN A MICROSERVICE ARCHITECTURE

CROSS-REFERENCE TO RELATED APPLICATIONS

The present application is a continuation of U.S. patent application Ser. No. 17/484,094, entitled "TENANT COPY OPERATION IN A MICROSERVICE ARCHITECTURE" and filed on Sep. 24, 2021, the entire disclosure of which is incorporated herein by reference in its entirety.

BACKGROUND

Multi-Tenant cloud applications including microservice architecture may be used to serve a variety of client requests. However, each microservice may have a different degree of scalability, resilience, and persistency. For example, in some cases each microservice may have its own persistency for storing tenant data. As such, it becomes difficult to manage and synchronize persistency across multiple microservices.

Another issue is present in monitoring tenant data across a plurality of microservices. For example, it may be difficult to determine whether tenant data is copied consistently across the various microservices.

SUMMARY

Embodiments solve the above-mentioned problems by providing systems, methods, and computer-readable media for copying tenant data within a cloud-based microservice architecture including generating copy tasks for a plurality of microservices and monitoring the progress of the copy tasks. In some embodiments, the plurality of microservices may be supported on a Kubernetes cluster.

A first embodiment is directed to one or more non-transitory computer-readable media storing computer-executable instructions that, when executed by a processor, perform a method for copying tenant data within a cloud-based microservice architecture including a Kubernetes cluster, the method comprising initiating, on a tenant service, a tenant copy operation associated with a set of tenant data for a tenant, generating a copy task for each of a plurality of microservices subscribed to the tenant service, executing one or more events of the copy task including copying the set of tenant data in the plurality of microservices, determining that the copy task is completed for at least one microservice of the plurality of microservices, responsive to determining that the copy task is completed for the at least one microservice, updating a status for the respective copy task, determining that the copy task is completed for each of the plurality of microservices, and responsive to determining that the copy task is completed for the entire plurality of microservices, updating a status of the tenant copy operation in the tenant service.

A second embodiment is directed to a method for copying tenant data within a cloud-based microservice architecture including a Kubernetes cluster, the method comprising initiating, on a tenant service, a tenant copy operation associated with a set of tenant data for a tenant, generating a copy task for each of a plurality of microservices subscribed to the tenant service, executing one or more events of the copy task including copying the set of tenant data in the plurality of microservices, determining that the copy task is completed for at least one microservice of the plurality of microservices, responsive to determining that the copy task is completed for the at least one microservice, updating a status for the respective copy task, determining that the copy task is completed for each of the plurality of microservices, and responsive to determining that the copy task is completed for the entire plurality of microservices, updating a status of the tenant copy operation in the tenant service.

A third embodiment is directed to a cloud-based microservice system comprising a Kubernetes cluster with a plurality of microservices, and a processor programmed to perform a method for copying tenant data within a cloud-based microservice system, the method comprising initiating, on a tenant service, a tenant copy operation associated with a set of tenant data for a tenant, generating a copy task for each of the plurality of microservices, the plurality of microservices subscribed to the tenant service, executing one or more events of the copy task including copying the set of tenant data in the plurality of microservices, determining that the copy task is completed for at least one microservice of the plurality of microservices, responsive to determining that the copy task is completed for the at least one microservice, updating a status for the respective copy task, determining that the copy task is completed for each of the plurality of microservices, and responsive to determining that the copy task is completed for the entire plurality of microservices, updating a status of the tenant copy operation in the tenant service.

Additional embodiments are directed to generating one or more test tenants based at least in part on a set of master data associated with a cloud-based microservice architecture, wherein the test tenants are used to test configurations or to train employees.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments are described in detail below with reference to the attached drawing figures, wherein.

The drawing figures do not limit the disclosure to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the disclosure in sufficient detail to enable those skilled in the art to practice the present teachings. Other embodiments can be utilized and changes can be made without departing from the scope of the disclosure. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
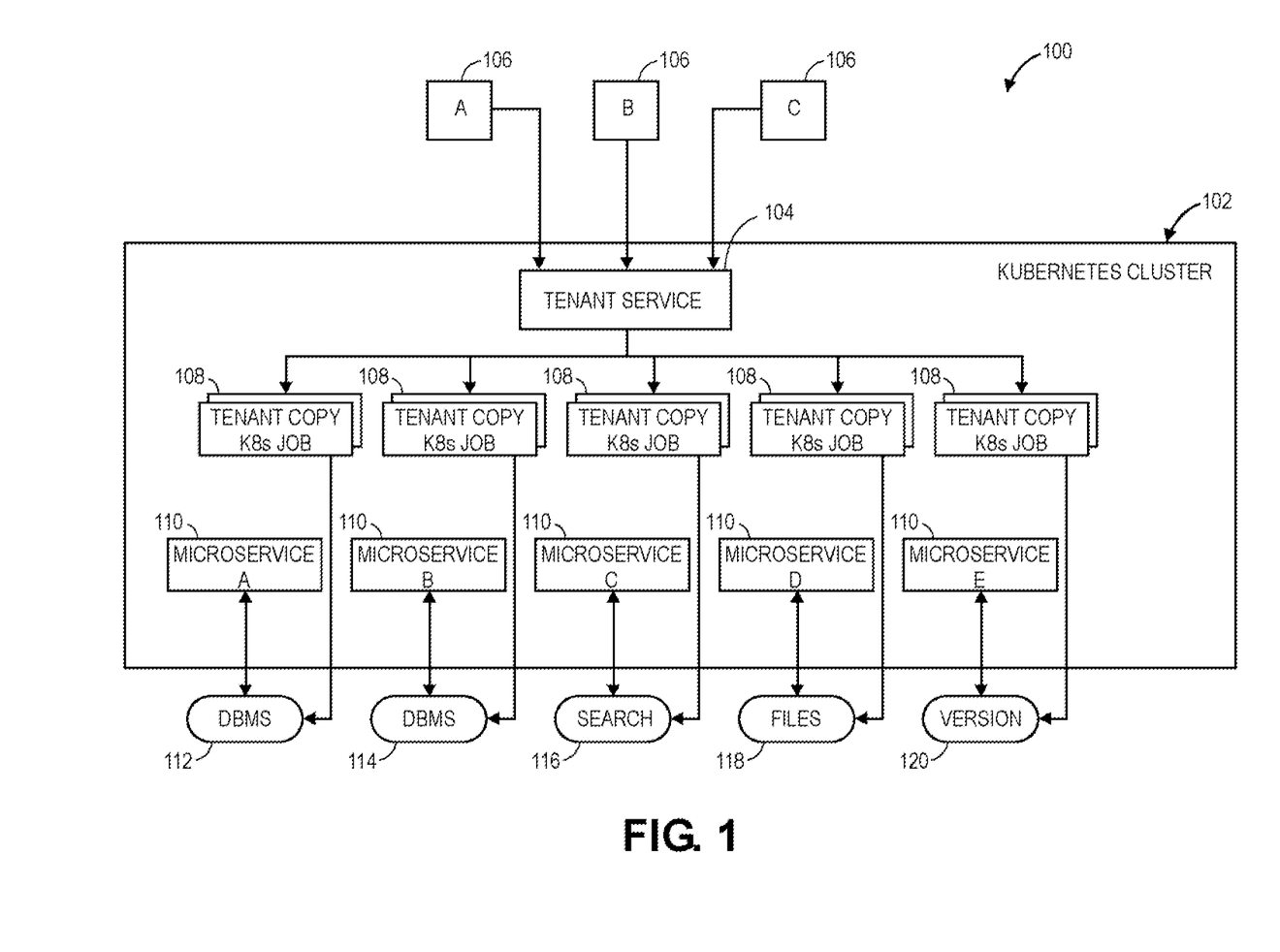
FIG. 1 depicts an exemplary system diagram illustrating components of a microservice architecture relating to some embodiments.

Turning first to FIG. 1, system 100 is illustrated in connection with an exemplary system diagram, which relates to various embodiments. In some embodiments, the system 100 includes a Kubernetes cluster 102 comprising a plurality of nodes and a plurality of pods. In some embodiments, a tenant service 104 may be included for servicing a tenant data copy operation. In some such embodiments, the tenant service 104 may be a microservice running on the Kubernetes cluster 102, as shown. Further, the tenant service 104 may be configured to receive tenant data from a plurality of tenants 106. For example, the tenant service 104 may be communicatively coupled to one or more tenants 106 for receiving tenant data. In some embodiments, the tenants 106 may include entities such as organizations of multiple users or single users utilizing the functionality of the microservices running on the Kubernetes cluster 102.

In some embodiments, the tenant service 104 generates a plurality of tasks 108 within the Kubernetes cluster 102. Here, the tasks 108 may include tenant data copying tasks for copying tenant data across the Kubernetes platform. In some embodiments, the tasks 108 may be Kubernetes jobs configured to be executed by the Kubernetes cluster 102. The Kubernetes cluster 102 may include a plurality of microservices 110 each of which may be associated with a respective pod of the Kubernetes cluster 102. In some embodiments, each microservice 110 may be associated with a storage component, for example, a first database management system 112, a second database management system 114, a search system 116, a file system 118, or a version control system 120. In some embodiments, the first database management system 112 may be a relational database management system such as, for example, PostgreSQL, and the second database management system 114 may be a non-structured or unstructured database management system such as, for example, MongoDB. In some embodiments, each microservice may have exclusive persistency such that a given microservice manages, in connection with a tenant entry, tenant data independently from the other microservices.

In some embodiments, the search system 116 may be associated with a search microservice for searching for data stored on the search system 116. Similarly, the file system 118 may be associated with a file system microservice for file management. In some embodiments, the version control system 120 may store versioning data for a versioning microservice. Here, the versioning data may be associated with changes over time for stored documents. However, it should be understood that the microservices described herein are just a few examples and that a variety of different microservices not explicitly described herein are contemplated.

In some embodiments, the tenant service 104 may be configured to copy tenant data from a source tenant to a target tenant. Accordingly, a new tenant may be created for a user and the tenant data is copied from the source to the target. In some embodiments, the tenant data may be copied in response to receiving a copy request from a user. For example, a user may log into a tenant account associated with the microservice architecture to request a copy of the tenant data. In some embodiments, the tenant service 104 may perform a variety of specialized tasks including creating tenants, copying tenant data, deleting tenant data, restoring tenant data, and backing up tenant data. In some embodiments, the tenant service 104 may act as a specialized microservice within the Kubernetes cluster 102. Embodiments are contemplated in which each of the plurality of microservices 110 may subscribe to the tenant service 104 for the copy functionality of the tenant service 104. Accordingly, the tenant service 104 may provide a copy task for each subscribed microservice, the copy task operable to generate a copy of the tenant data for the microservice. In some embodiments, the copied tenant data may be directly stored on the microservice. Alternatively, in some embodiments, the copied tenant data may be stored on one of the database management systems 112, 114, the search system 116, the file system 118, the version control system 120, or on a data store accessible to the respective microservice such that the copied tenant data is accessible to the microservice.

Figure 2:
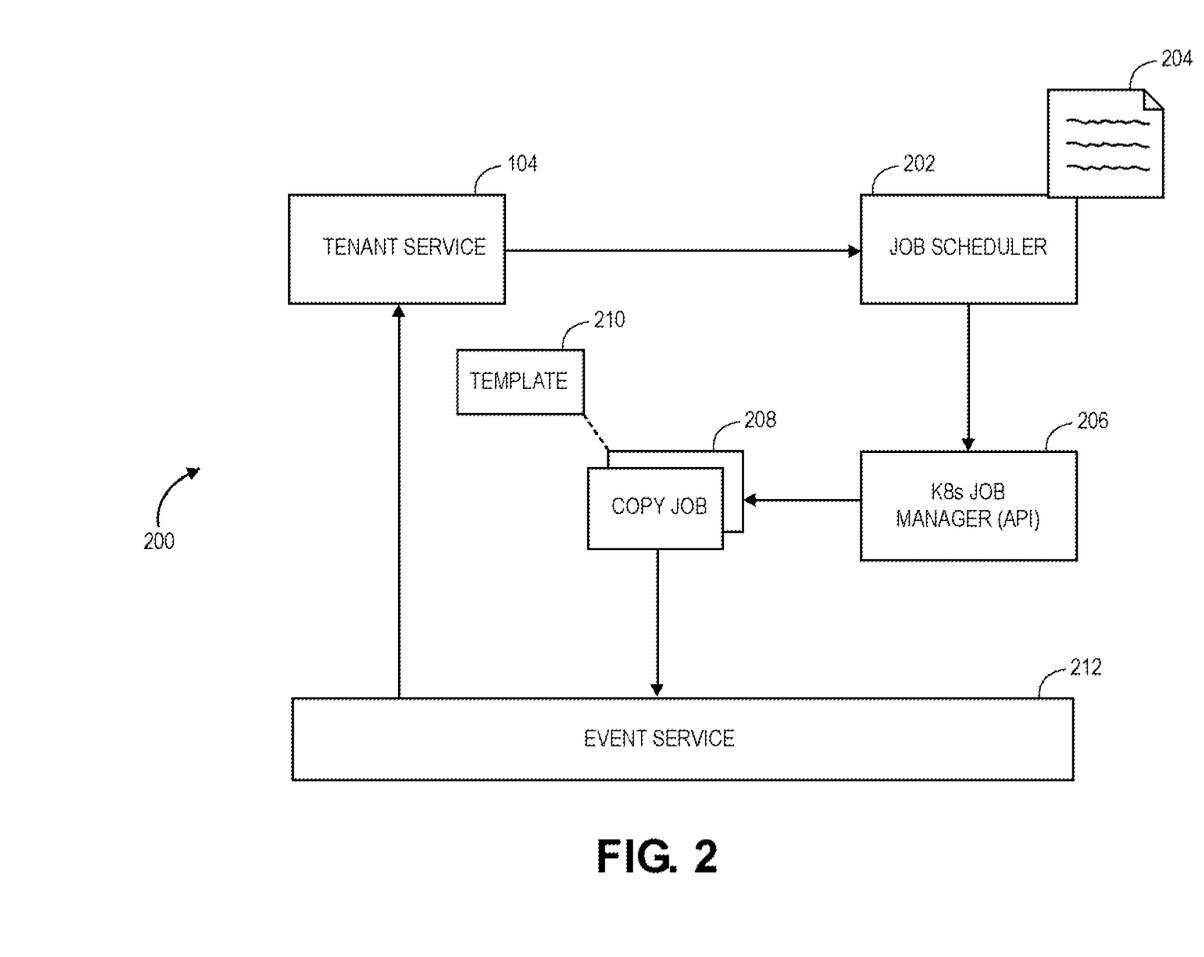
FIG. 2 depicts an exemplary flow diagram for copying tenant data relating to some embodiments.

Turning now to FIG. 2, an exemplary flow diagram referred to generally by reference numeral 200 is depicted relating to some embodiments. The diagram 200 includes the tenant service 104, as shown. In some embodiments, the tenant service 104 submits an operation to a job scheduler 202. Here, the operation may be submitted as a message including text or some other form of instructions to perform one or more copy jobs associated with the operation. Accordingly, in some embodiments, the job scheduler 202 may generate one or more job files 204 based on the received instructions. In some embodiments, the job scheduler 202 may further translate the instructions into a file type that is readable by one or more of the microservices 110.

In some embodiments, the job scheduler 202 may be communicatively coupled to a job manager 206. In some such embodiments, the job manager 206 may run on the Kubernetes cluster 102 and may communicate through an Application Programming Interface (API). Accordingly, the job scheduler 202 may interface with the job manager 206 via API to submit API artifacts and retrieve one or more tags associated with the copy operation. In some embodiments, the job scheduler 202 provides the instructions from the tenant service 104 to the job manager 206. In some embodiments, the instructions may be provided by transmitting the one or more job files 204 to the plurality of microservices.

In some embodiments, the job manager 206 generates one or more copy jobs 208 based on the job files 204. For example, in some embodiments, the job manager provides a copy job for each of a plurality of microservices running on the Kubernetes cluster 102. Further, in some embodiments, the copy jobs 208 may be generated from a job template 210. In some embodiments, information associated with the copy jobs 208 may be transmitted to an event service 212. In some embodiments, the event service 212 may be associated with the microservices of the Kubernetes cluster 102. For example, embodiments are contemplated in which the event service 212 receives an indication of the status of the one or more copy jobs 208. In some embodiments, the tenant service 104 may be subscribed to the event service 212 such that the tenant service 104 receives information from the event service 212. For example, the tenant service 104 may receive status information associated with the copy jobs 208.

In some embodiments, the copy jobs 208 comprise configuration data associated with a subscription of the microservice to the tenant service 104. In some such embodiments, the configuration data may be used to connect to an underlying tenant persistency of the microservice. Accordingly, embodiments are contemplated in which the configuration data includes schema information associated with the tenant persistency of the microservice. For example, the schema information may be associated with a data storage schema for a data store associated with the given microservice. As such, job files 204 may include configuration data so that the copied tenant data can be stored and formatted according to the specific data storage schema of the microservice. Accordingly, each of the job files 204 may be specific to a particular microservice.

Figure 3:
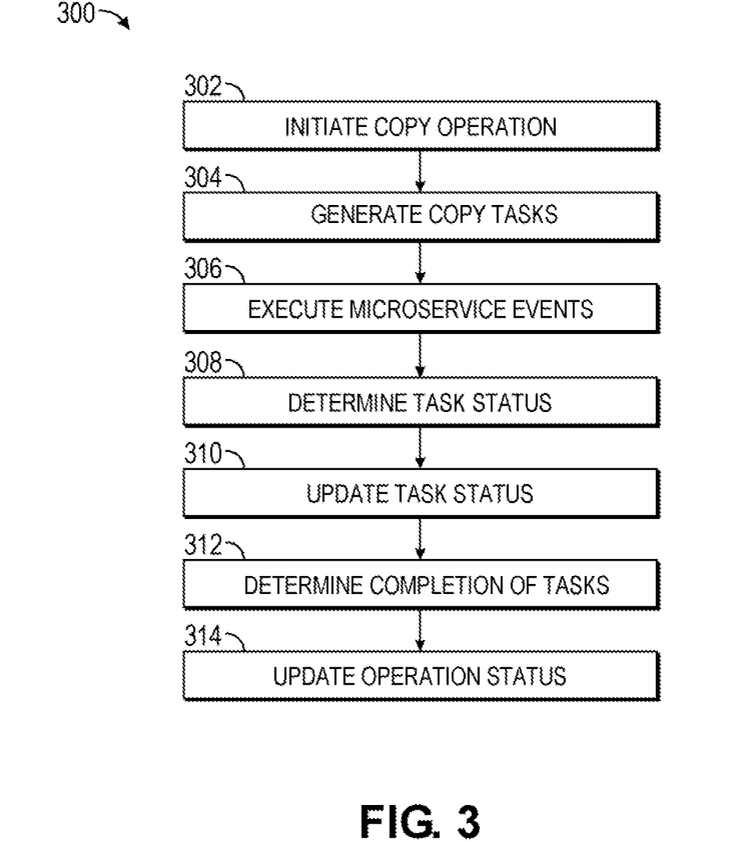
FIG. 3 depicts an exemplary method for copying tenant data within a cloud-base microservice environment relating to some embodiments.

Turning now to FIG. 3, a method 300 for copying tenant data within a cloud-based microservice environment is depicted relating to some embodiments. In some such embodiments, at least one of the steps described herein may be performed using any of the tenant service 104, the job scheduler 202, the job manager 206, the event service 212, or any of the one or more microservices 110 of the Kubernetes cluster 102. Further, embodiments are contemplated in which operations may be distributed across multiple entities. For example, in some embodiments, a first portion of the steps of method 300 may be carried out using the tenant service 104 while a second portion of the steps are carried out on the job manager 206. In some embodiments, the steps described herein may be performed using a processor of any of the components of the system 100, as shown in FIG. 1. For example, in some embodiments, steps may be executed on a processor associated with the tenant service 104.

At step 302 a tenant copy operation is initiated. In some embodiments, the copy operation may be initiated by the tenant service 104. In some embodiments, the tenant copy operation may be initiated in response to a user input or other event. For example, embodiments are contemplated in which the copy operation is initiated in response to a change to tenant data. Here, a user may change tenant data by adding a new tenant or by editing tenant information within a tenant data service.

At step 304 one or more copy tasks are generated based on the initiated tenant copy operation. Here, the copy tasks may be generated as one or more job files 204, for example, using the job scheduler 202. In some embodiments, the copy tasks may be generated based on a specific microservice. For example, a different copy task may be generated for each microservice of the plurality of microservices 110. In some such embodiments, the job file 204 may include code which is compatible with the respective microservice. Further, the specific copy tasks and job files may be configured to interact with a specific database type associated with a given microservice. For example, the job file 204 may include copy functions that are specific to the data base management system 112 or the files system 118.

At step 306 one or more events are executed for a microservice of the plurality of microservices 110. In some embodiments, the events may be executed by executing one or more lines of code of the generated copy tasks or job files 204. In some embodiments, the events may be executed using the job manager 206. In some embodiments, the events include copying tenant data for the microservice. For example, a set of tenant data associated with the copy task or job file may be copied and updated within a database associated with the respective microservice.

At step 308 a status is determined for one or more of the copy tasks. Here, the status may be determined as either of completed or incomplete. For example, in some embodiments, the job file may include a status variable that may be updated to a complete status after one or more lines of code of the job file has been executed. At step 310 a status for one or more of the copy tasks is updated in response to determining the status of the task. In some embodiments, the status may be updated in either of the tenant service 104 or the job manager 206. For example, in some embodiments, an indication of the status is published to the event service 212 such that the status is accessible by the tenant service 104. In some embodiments, the tenant service 104 may be associated with a data store for storing the status information. In some embodiments, statistics associated with the copy task may also be shared with the tenant service 104. For example, in some embodiments, an event associated with the copy task may be generated and published to the event service 212.

At step 312 it may be determined how many of the tasks have been completed. In some embodiments, this may be accomplished by checking the status for each of the plurality of tasks. In some embodiments, the statuses may be checked using the tenant service 104. For example, the data store associated with the tenant service 104 may be accessed to retrieve the status information. At step 314 a status for the copy operation is updated to complete in response to determining that all of the copy tasks have been completed.

In some embodiments, the copy operation may include a queue of copy tasks. Accordingly, the queue may be monitored by reviewing the status for each of the copy tasks in the queue. Here, each copy task of the queue may be carried out asynchronously. Accordingly, in some embodiments, the copy tasks may be executed simultaneously such that a first task is executed in a first microservice while a subsequent task is executed in another microservice and the tasks do not have to be completed in any particular order.

Figure 4:
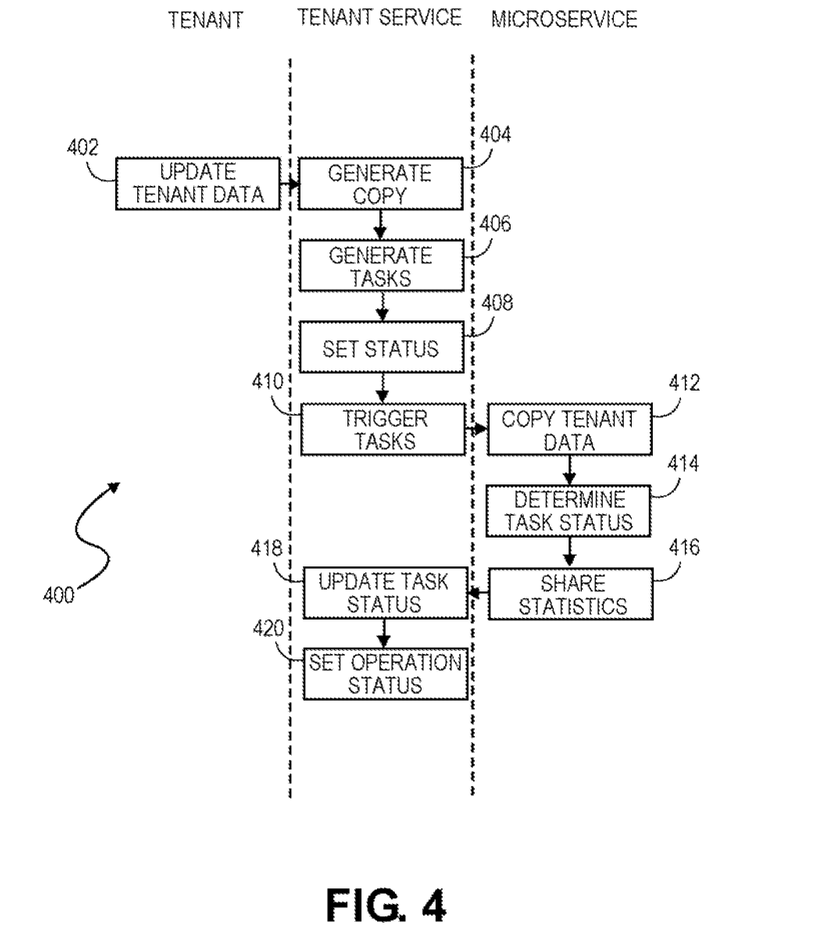
FIG. 4 depicts a swim lane diagram illustrating the component responsibility flow of a process relating to some embodiments.

Turning now to FIG. 4, an exemplary swim lane diagram is depicted illustrating component responsibility flow for a process of copying tenant data relating to some embodiments. In some embodiments, the steps of the copying process may be divided between one or more entities such as a tenant device, a tenant service, and a microservice, as shown. At step 402 tenant data may be updated, for example, using a tenant device such as one of tenants 106. In some embodiments, updating tenant data may include any combination of adding a new tenant, removing a tenant, or editing existing tenant information.

At step 404 the tenant service 104 generates a copy of the received tenant data. In some embodiments, the copy may be configured in a form which is accessible by a specific microservice. Accordingly, embodiments are contemplated in which a plurality of copies are generated for a respective plurality of microservices. At step 406 a plurality of copy tasks is generated. In some embodiments, each of the copy jobs is generated for a specific microservice of the plurality of microservices. In some such embodiments, each copy task may include one or more lines of code for copying the tenant data within a specific microservice. For example, in some embodiments, the copy task may comprise one or more copying functions for generating a copy of the tenant data within a data store associated with the microservice.

At step 408 a status is set for the copy operation. In some embodiments, a status may be set for each of the plurality of copy tasks. In some embodiments, a status may be created for the entire copy operation, as well as for each task. Accordingly, the progress of the copying operation may be monitored as a whole and for each individual microservice. At step 410 the copy tasks are triggered for the plurality of microservices. In some embodiments, the copy tasks may be triggered by transmitting the job files or copy tasks to the plurality of microservices, which may be implemented using the job scheduler 202 or job manager 206. In some embodiments, the copy tasks may be initiated as asynchronous events within each microservice. Accordingly, each copy task may be configured to self-terminate and publish information back to the tenant service 104, as will be described in further detail below.

At step 412 the tenant data is copied for each microservice. In some embodiments, the tenant data may be copied when executing the job file which may be configured to store the tenant data within a data store. In some embodiments, if it is determined that the tenant does not already exist within the microservice, the tenant may be provisioned and added within the microservice. At step 414 the status of the copy task is determined. In some embodiments, the status may be determined by checking whether the copy task has been completed. At step 416 statistics associated with the copy task may be shared to the tenant service 104. Here, the statistics may include the status of the copy task as well as other task related information. In some embodiments, the statistics may be published to the event service 212 such that they are accessible to the tenant service 104.

At step 418 a status for one or more of the copy tasks may be updated in the tenant service 104. In some embodiments, the status may be updated in the tenant service 104 based on the statistics shared at step 416. In some embodiments, the tenant service 104 may monitor the progress for the copy task of each microservice by updating and reviewing the status for each copy task. For example, embodiments are contemplated in which the tenant service 104 can automatically initiate a further copy task in response to a copy task not completing within a predetermined period of time. Further, in some embodiments, an email or other communication may be automatically transmitted to one or more users indicating the failure/success for each of the copy tasks, such that a user can monitor the copy tasks. Further still, in some embodiments, the status and statistics of the tenant copy tasks may be published to a user interface for monitoring the copy operation. At step 420 a status for the copy operation may be updated in the tenant service 104. In some embodiments, the status of the copy operation may be updated in response to determining that all of the copy tasks have been completed. Accordingly, the status of the copy operation may be indicative of successful copying of the tenant data on each of the plurality of microservices.

In some embodiments, a tenant status may be updated responsive to updating the copy operation status. For example, in some embodiments, the tenant status may be updated to a live status to indicate that the tenant data for each microservice includes the most recently updated tenant information. Accordingly, in some embodiments, each tenant of a plurality of tenants may include a tenant status indicating whether the tenant data in the plurality of microservices is accurate. Further, the task statuses may be used to identify one or more microservices which do not have the most recently updated tenant data.

In some embodiments, the tenant data may be copied across each of the microservices. Accordingly, the tenant copy operation described herein provides scalability to the cloud-based microservice architecture. Here, horizontal scaling may be achieved and a single Kubernetes cluster may provide service to a plurality of users. Alternatively, embodiments are contemplated in which the tenant data may only be copied for a portion of the plurality of microservices. For example, in some embodiments, it may be desirable that tenant data is only persisted for certain microservices. Here, the tenant service 104 may determine a portion of the plurality of microservices that are associated with the tenant for which data is being copied. In some embodiments, a scope for the tenant may be stored within a data store associated with the tenant service 104 indicating which microservices the tenant is associated with. Accordingly, the copying operation may be optimized such that the tenant data is only copied where necessary for a given tenant.

In some embodiments, the tenant copy operation may be used to generate a test tenant. For example, the tenant copy operation may provide a test tenant based on real-world tenant data for testing various microservices or for training employees. In some embodiments, one or more test tenants may be generated based at least in part on a set of master data associated with the tenant or with the plurality of microservices. Here, the test tenants may be used for training by simulating real-world tenant environment.

Figure 5:
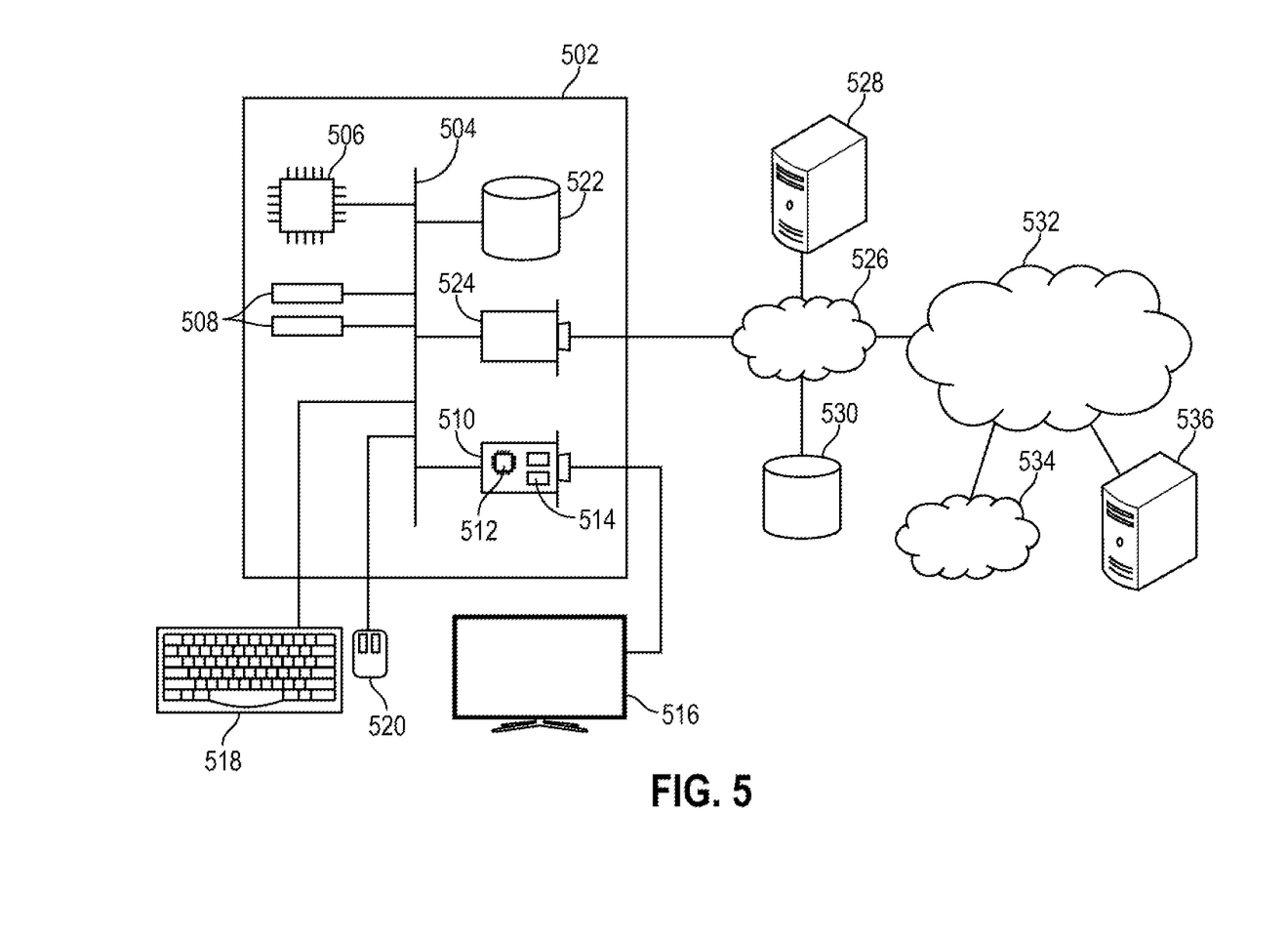
FIG. 5 depicts an exemplary hardware platform for carrying out certain embodiments.

Turning now to FIG. 5, an exemplary hardware platform for certain embodiments is depicted. Computer 502 can be a desktop computer, a laptop computer, a server computer, a mobile device such as a smartphone or tablet, or any other form factor of general- or special-purpose computing device. Depicted with computer 502 are several components, for illustrative purposes. In some embodiments, certain components may be arranged differently or absent. Additional components may also be present. Included in computer 502 is system bus 504, whereby other components of computer 502 can communicate with each other. In certain embodiments, there may be multiple busses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also on graphics card 510 is GPU memory 514. Connected (directly or indirectly) to graphics card 510 is display 516 for user interaction. In some embodiments no display is present, while in others it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media, and may be internally installed in computer 502 or externally and removably attached.

Such non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 524 is also attached to system bus 504 and allows computer 502 to communicate over a network such as network 526. NIC 524 can be any form of network interface known in the art, such as Ethernet, ATM, fiber, Bluetooth, or Wi-Fi (i.e., the IEEE 802.11 family of standards). NIC 524 connects computer 502 to local network 526, which may also include one or more other computers, such as computer 528, and network storage, such as data store 530. Generally, a data store such as data store 530 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 528, accessible on a local network such as local network 526, or remotely accessible over Internet 532. Local network 526 is in turn connected to Internet 532, which connects many networks such as local network 526, remote network 534 or directly attached computers such as computer 536. In some embodiments, computer 502 can itself be directly connected to Internet 532.

Although the present teachings have been described with reference to the embodiments illustrated in the attached drawing figures, it is noted that equivalents may be employed and substitutions made herein without departing from the scope of the present teachings as recited in the claims.

Having thus described various embodiments, what is claimed as new and desired to be protected by Letters Patent includes the following:

1. One or more non-transitory computer-readable media storing computer-executable instructions that, when executed by a processor, perform a method for copying tenant data within a cloud-based microservice architecture, the method comprising:
   generating a copy task for each of a plurality of microservices subscribed to a tenant service;
   executing one or more events of the copy task including copying a set of tenant data for a tenant in the plurality of microservices;
   determining whether the copy task has been completed for at least one microservice of the plurality of microservices;
   responsive to determining that the copy task has been completed for the at least one microservice, updating a status for the respective copy task;
   determining whether the copy task has been completed for each of the plurality of microservices; and
   responsive to determining that the copy task has been completed for each of the microservices, updating a status of a tenant copy operation in the tenant service.

2. The media of claim 1, wherein each microservice of the plurality of microservices is associated with a respective pod of a Kubernetes cluster.

3. The media of claim 2, wherein the set of tenant data is copied and stored on each of a relational data base associated with one of the plurality of microservices and a non-structured data base associated with another one of the plurality of microservices.

4. The media of claim 1, further comprising:
   determining whether the copy task has not been completed within a predetermined period of time; and
   in response to determining that the copy task is not completed, automatically initiating a subsequent copy task for one of the plurality of microservices.

5. The media of claim 1, wherein the copy task comprises a microservice-specific job file including one or more lines of code executable by a processor to cause a computing device to store the set of tenant data within a data store associated with a respective microservice of the plurality of microservices.

6. The media of claim 1, further comprising transmitting a set of statistics associated with the copy task to the tenant service, wherein the set of statistics includes status information for the copy task.

7. The media of claim 1, further comprising in response to updating the status of the tenant copy operation, updating a status for the tenant associated with the tenant data to a live status.

8. A method for copying tenant data within a cloud-based microservice architecture, the method comprising:
   generating a copy task for each of a plurality of microservices subscribed to a tenant service;
   executing one or more events of the copy task including copying a set of tenant data for a tenant in the plurality of microservices;
   determining whether the copy task has been completed for at least one microservice of the plurality of microservices;
   responsive to determining that the copy task has been completed for the at least one microservice, updating a status for the respective copy task;
   determining whether the copy task has been completed for each of the plurality of microservices; and
   responsive to determining that the copy task has been completed for each of the microservices, updating a status of a tenant copy operation in the tenant service.

9. The method of claim 8, further comprising determining a portion of the plurality of microservices that are associated with the tenant.

10. The method of claim 9, further comprising:
    determining whether a tenant entry for the tenant does not exist in one of the plurality of microservices; and
    in response to determining that the tenant entry does not exist, provisioning a tenant entry for the tenant.

11. The method of claim 8, wherein each of the plurality of microservices is subscribed to the tenant service via an event service associated with the microservice architecture.

12. The method of claim 11, further comprising transmitting a set of statistics associated with the copy task to the tenant service, wherein the set of statistics includes status information for the copy task.

13. The method of claim 12, further comprising:
    determining whether the copy task has not been completed within a predetermined period of time; and
    in response to determining that the copy task has not been completed, automatically initiating a subsequent copy task for one of the plurality of microservices.

14. The method of claim 13, wherein the tenant copy operation is initiated in response to receiving a change to the set of tenant data.

15. A cloud-based microservice system comprising:
a processor programmed to perform a method for copying tenant data within a cloud-based microservice system, the method comprising:
 initiating, on a tenant service, a tenant copy operation associated with a set of tenant data for a tenant;
 generating a copy task for each of a plurality of microservices, the plurality of microservices being subscribed to the tenant service;
 executing one or more events of the copy task including copying the set of tenant data in the plurality of microservices;
 determining that the copy task is completed for at least one microservice of the plurality of microservices;
 responsive to determining that the copy task is completed for the at least one microservice, updating a status for the respective copy task;
 determining that the copy task is completed for each of the plurality of microservices; and
 responsive to determining that the copy task is completed for each of the microservices, updating a status of the tenant copy operation in the tenant service.

16. The system of claim 15, further comprising:
 a job scheduler communicatively coupled with the tenant service for generating one or more job files associated with the tenant copy operation; and
 a job manager communicatively coupled with the job scheduler for executing the copy tasks for each of the plurality of microservices.

17. The system of claim 16, wherein the job manager generates one or more copy jobs based at least in part on a job template.

18. The system of claim 17, further comprising an event service for publishing information to the tenant service.

19. The system of claim 15, further comprising:
 a first database management system associated with a first microservice of the plurality of microservices;
 a second database management system associated with a second microservice of the plurality of microservices;
 a search system associated with a third microservice of the plurality of microservices;
 a file system associated with a fourth microservice of the plurality of microservices; and
 a version control system associated with a fifth microservice of the plurality of microservices.

20. The system of claim 19, wherein executing one or more events of the copy task includes copying the tenant data on the first database management system such that the tenant data is accessible by the first microservice.

* * * * *